United States Patent
Sadasue et al.

(10) Patent No.: US 9,912,427 B2
(45) Date of Patent: Mar. 6, 2018

(54) RECEPTION APPARATUS AND SYSTEM

(71) Applicants: Tamon Sadasue, Kanagawa (JP);
Yasuhiro Kajiwara, Kanagawa (JP);
Kazuhiro Takazawa, Tokyo (JP);
Kazufumi Matsushita, Kanagawa (JP);
Yasuko Shirataka, Kanagawa (JP);
Yasuko Hashimoto, Kanagawa (JP);
Satoshi Aoki, Kanagawa (JP)

(72) Inventors: Tamon Sadasue, Kanagawa (JP);
Yasuhiro Kajiwara, Kanagawa (JP);
Kazuhiro Takazawa, Tokyo (JP);
Kazufumi Matsushita, Kanagawa (JP);
Yasuko Shirataka, Kanagawa (JP);
Yasuko Hashimoto, Kanagawa (JP);
Satoshi Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/196,179

(22) Filed: Jun. 29, 2016

(65) Prior Publication Data

US 2017/0019245 A1   Jan. 19, 2017

(30) Foreign Application Priority Data

Jul. 17, 2015   (JP) .................................. 2015-142707

(51) Int. Cl.
*H04L 25/00* (2006.01)
*H04J 3/06* (2006.01)
(Continued)

(52) U.S. Cl.
CPC ...... *H04J 3/0658* (2013.01); *H04L 12/40078* (2013.01); *H04N 21/242* (2013.01); *H04N 21/4305* (2013.01); *H04L 65/80* (2013.01)

(58) Field of Classification Search
CPC .... H04J 3/076; H04J 3/0632; H04N 21/4341; H04N 21/2381
(Continued)

(56) References Cited

U.S. PATENT DOCUMENTS 8,295,618 B2   10/2012   Sadasue et al.
8,649,616 B2   2/2014   Sadasue et al.
(Continued)

FOREIGN PATENT DOCUMENTS

JP   2003-018585   1/2003

*Primary Examiner* — Khai Tran
(74) *Attorney, Agent, or Firm* — IPUSA, PLLC (57) ABSTRACT

A reception apparatus for receiving data from a transmission apparatus includes a data receiver configured to receive a synchronization packet including clock information generated by the transmission apparatus and data from the transmission apparatus, a storage memory, storing the received data, a clock adjuster configured to correct a clock of the reception apparatus based on a deviation between a clock of the transmission apparatus and the clock of the reception apparatus by using the clock information generated by the transmission apparatus, a controller configured to control a clock correction amount of the clock adjuster based on a storage amount of data in the storage memory, and a data output circuit configured to retrieve the data from the storage memory to output the retrieved data in synchronization with the corrected clock.

5 Claims, 8 Drawing Sheets

(51) Int. Cl.
- *H04L 12/40* (2006.01)
- *H04N 21/242* (2011.01)
- *H04N 21/43* (2011.01)
- *H04L 29/06* (2006.01)

(58) Field of Classification Search
USPC .......... 375/372, 316, 326, 240.01; 379/359; 725/116
See application file for complete search history.

(56) References Cited

U.S. PATENT DOCUMENTS

| | | | |
|---|---|---|---|
| 2008/0225942 A1* | 9/2008 | Nakamura | H04N 21/235 375/240.01 |
| 2008/0259962 A1* | 10/2008 | Mori | H04N 21/4305 370/498 |
| 2009/0077168 A1 | 3/2009 | Sadasue | |
| 2009/0119583 A1 | 5/2009 | Kihara et al. | |
| 2009/0238483 A1 | 9/2009 | Sadasue | |
| 2011/0164283 A1 | 7/2011 | Sadasue et al. | |
| 2012/0120128 A1* | 5/2012 | Oh | H04N 13/0438 345/691 |
| 2013/0235061 A1 | 9/2013 | Sadasue | |
| 2016/0014429 A1 | 1/2016 | Takazawa et al. | |

* cited by examiner

RECEPTION APPARATUS AND SYSTEM

BACKGROUND OF THE INVENTION

1. Field of the Invention

The present disclosure relates to reception apparatuses and systems.

2. Description of the Related Art

In a system, in which data is transmitted from a transmission apparatus to a reception apparatus in real time, a technology is used, which enables adjustment of an operation clock of the transmission apparatus and an operation clock of the reception apparatus so that discrepancy of number of frames to be processed between the transmission apparatus and the reception apparatus does not occur.

For example, a remote monitoring system, in which video image data captured by a monitoring camera is distributed to monitoring devices via a LAN (Local Area Network), is used. Even if the same type of clock generators are respectively used in the monitoring camera at transmission side and monitoring device at reception side, a clock of transmission side may vary from that of reception side due to individual difference between the clock generators, temperature difference between installation places of clock generators, and the like.

A method is known, in which synchronization information related to the clock is transmitted from the reception apparatus to the transmission apparatus, thereby adjusting the operation clock of the transmission side to synchronize respective apparatuses (e.g., Japanese Unexamined Patent Application Publication No. 2003-018585).

However, in conventional technology of synchronization, a delay from receiving data to reproducing the data becomes greater.

For example, when the video image data received from the transmission apparatus is stored in a buffer of reception apparatus, and the reception apparatus sequentially retrieves the video image data to reproduce the video image, discrepancy of operation clocks in the transmission apparatus and the reception apparatus can be absorbed. Meanwhile, a delay from receiving data to reproducing the data becomes greater in this case.

RELATED ART DOCUMENT

[Patent Document]

[Patent Document 1]: Japanese Unexamined Patent

SUMMARY OF THE INVENTION

An object of present disclosure is to reduce the delay from receiving data to reproducing the data.

The following configuration is adopted to achieve the aforementioned object.

In one aspect of the embodiment of the present disclosure, there is provided a reception apparatus for receiving data from a transmission apparatus, including, a data receiver configured to receive a synchronization packet including clock information generated by the transmission apparatus and data from the transmission apparatus, a storage memory, storing the received data, a clock adjuster configured to correct a clock of the reception apparatus based on a deviation between a clock of the transmission apparatus and the clock of the reception apparatus by using the clock information generated by the transmission apparatus, a controller configured to control a clock correction amount of the clock adjuster based on a storage amount of data in the storage memory, and a data output circuit configured to retrieve the data from the storage memory to output the retrieved data in synchronization with the corrected clock.

Other objects, features, and advantages of the present disclosure will become apparent from the following detailed description when read in conjunction with the accompanying drawings.

DETAILED DESCRIPTION OF THE PREFERRED EMBODIMENTS

In the following, embodiments of present disclosure are described with reference to accompanying drawings. Additionally, in respective drawings, identical reference numerals will be applied to an elements or the like that have substantially similar functions and configurations to those in another drawing, and descriptions thereof may be omitted.

First Embodiment

Figure 1:
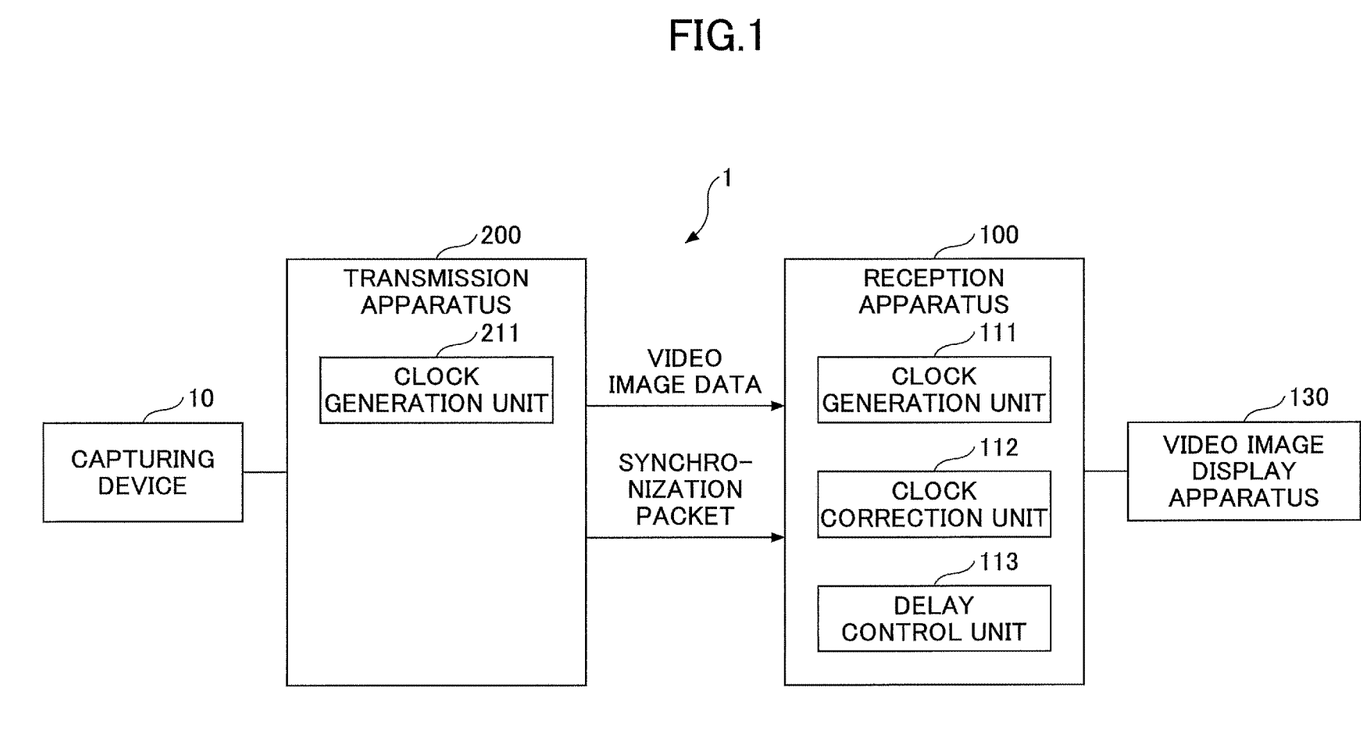
FIG. 1 is a diagram illustrating a first example of video image distribution system.

FIG. 1 is a diagram illustrating a first example of video image distribution system. The video image distribution system 1 includes a reception apparatus 100 and a transmission apparatus 200. The reception apparatus 100 includes a clock generation unit 111, a clock correction unit 112, and a delay control unit 113. Also, the transmission apparatus 200 includes a clock generation unit 211.

The transmission apparatus 200 receives video image data captured by a capturing device 10. The clock generation unit 211 generates oscillation at a predetermined frequency to generate an operation clock. The operation clock is used for operating the transmission apparatus 200. The processes in the reception apparatus 200 are performed based on the operation clock, and the operation according to the process is synchronized with the operation clock when the apparatus performs the process at the operation clock. The transmission apparatus 200 transmits the video image data to the reception apparatus 100 at the operation clock generated by the clock generation unit 211.

Also, the transmission apparatus 200 generates a synchronization packet at intervals of predetermined clocks. The transmission apparatus 200 counts the clock up to a predetermined number to include the counted number of clocks in the synchronization packet, and transmits the synchronization packet to the reception apparatus 100. After the synchronization packet is transmitted, the transmission apparatus 200 resets the counted number, and starts counting the clock again.

For example, the transmission apparatus 200 generates the synchronization packet at ten clocks intervals. In this case, the transmission apparatus 200 inserts a number of clocks "10" in the synchronization packet upon counting up ten clocks, and transmits the synchronization packet to the reception apparatus 100. After the synchronization packet is transmitted, the transmission apparatus 200 resets the counted number to be "0", and starts counting the clocks again.

The reception apparatus 100 sequentially stores video image data received from the transmission apparatus 200 in a buffer. The clock generation unit 111 generates an oscillation at the same frequency as that of the transmission apparatus 200 to generate the operation clock. The operation clock is used for operating the reception apparatus 100. The processes in the reception apparatus 100 are performed based on the operation clock, and the operation according to the process is synchronized with the operation clock when the apparatus performs the process at the operation clock.

The clock correction unit 112 calculates deviation of operation clock between the transmission apparatus 200 and the reception apparatus 100 based on the received synchronization packet. The deviation of operation clock between the transmission apparatus 200 and the reception apparatus 100 means a time corresponding to difference between a number of operation clocks in a predetermined period in the reception apparatus 100 and a number of operation clocks in the predetermined period in the transmission apparatus 200. For example, the deviation of operation clock is a time corresponding to a number of clocks calculated by subtracting a number of clocks generated in the reception apparatus 100 during a period from receiving a synchronization packet (t−1) to receiving a synchronization packet (t) from a number of clocks generated in the transmission apparatus 200 during a period from transmitting the synchronization packet (t−1) to transmitting the synchronization packet (t).

The clock correction unit 112 corrects the operation clock generated by the clock generation unit 111 based on the calculated deviation of operation clock so that the corrected operation clock has the same frequency as that of the operation clock in the transmission apparatus 200. The reception apparatus 100 retrieves the video image data from the buffer at the corrected operation clock, thereby outputting the video image data to a video image display apparatus 130.

The delay control unit 113 controls a correction amount of operation clock by the clock correction unit 112 so that a period of (or amount of) the video image data is constantly stored in the buffer, where the period corresponds to a maximum deviation of operation clock between the reception apparatus 100 and the transmission apparatus 200. The maximum deviation of operation clock means a longest time among times corresponding to difference between a number of operation clocks in a predetermined period in the reception apparatus 100 and a number of operation clocks in the predetermined period in the transmission apparatus 200.

For example, in a case where the amount of video image data stored in the buffer is smaller in comparison to the maximum deviation, the delay control unit 113 controls the clock correction unit 112 so that the frequency of the operation clock becomes lower. On the other hand, in a case where the amount of video image data stored in the buffer is larger in comparison to the maximum deviation, the delay control unit 113 controls the clock correction unit 112 so that the frequency of the operation clock becomes higher.

Additionally, in descriptions given above, the delay control unit 113 controls a correction amount of operation clock by the clock correction unit 112 so that an amount corresponding to the maximum deviation of operation clock of the video image data is constantly stored in the buffer. However, this is not a limiting example. The delay control unit 113 may have the amount of the video image data constantly stored in the buffer be more than an amount corresponding to the deviation of operation clock.

Figure 2:
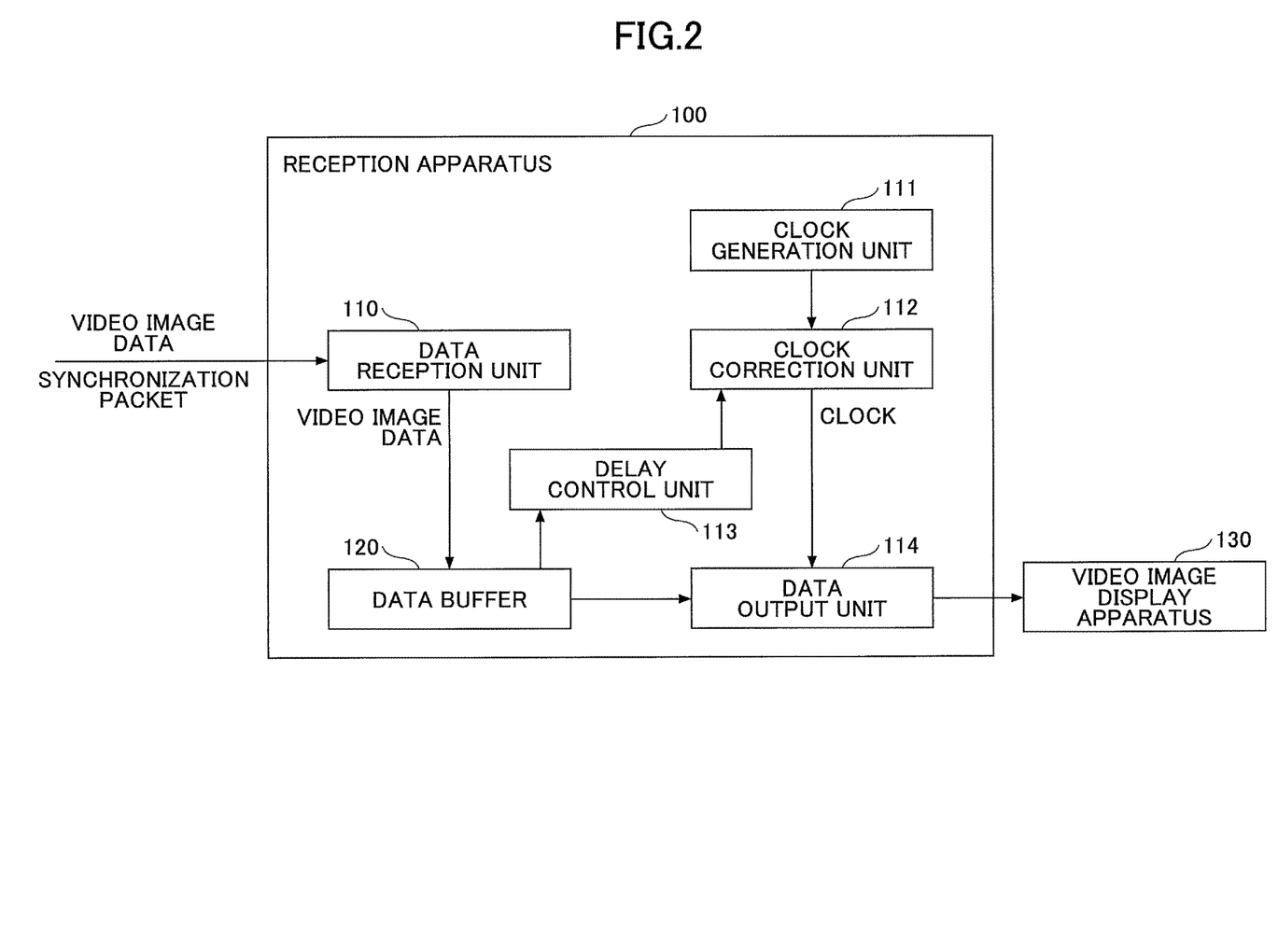
FIG. 2 is a diagram illustrating an example configuration of a reception apparatus.

FIG. 2 is a diagram illustrating an example configuration of the reception apparatus 100. The reception apparatus 100 includes a data reception unit 110, the clock generation unit 111, the clock correction unit 112, the delay control unit 113, a data output unit 114, and a data buffer 120. Also, the reception apparatus 100 is coupled to a video image display apparatus 130.

The data reception unit 110 receives the video image data and the synchronization packet. The data reception unit 110 stores the received video image data in the data buffer 120. Additionally, the video image data may be encoded data generated in compliance with H.264, JPEG (Joint Photographic Experts Group), and the like.

Also, the data reception unit 110 extracts clock count of the transmission apparatus 200 from the synchronization packet. The clock count means a number of clocks of the transmission apparatus 200 counted by the transmission apparatus 200. The clock count is reset at every reception of the synchronization packet from the transmission apparatus 200.

For example, in a case where the synchronization packet is transmitted at ten clocks intervals, the transmission apparatus 200 count up the clocks such as clock count "0", "1", "2", "3", . . . "7", "8", "9", and transmits the synchronization packet at the clock count "10", where a clock at transmission of the synchronization packet is used as a reference clock. The transmission apparatus 200 sets the clock count to be "0" again after transmitting the synchronization packet. The synchronization packet in which the clock count "10" is inserted by the transmission apparatus 200 is transmitted to the reception apparatus 100.

Hereinafter, the clock count counted during transmission interval of the synchronization packet in the transmission apparatus 200 is referred to as transmission side course count.

The data reception unit 110 transmits the transmission side course count extracted from the synchronization packet to the clock correction unit 112.

The clock generation unit 111 generates an oscillation at the same frequency as that of the transmission apparatus 200. The clock generation unit 111 generates the operation clock by dividing and multiplying a clock of the oscillation.

The clock correction unit 112 calculates the deviation of operation clock between the transmission apparatus 200 and the reception apparatus 100 based on the transmission side course count. The clock correction unit 112 corrects the operation clock generated by the clock generation unit 111 based on the calculated deviation of operation clock so that the frequency of the operation clock generated by the clock generation unit 111 coincides with the clock frequency of the transmission apparatus 200.

Even if clock generators that generate the same oscillation are respectively used in the transmission apparatus 200 and the reception apparatus 100, a clock of the transmission apparatus 200 may vary from that of the reception apparatus 100 due to individual difference between the clock generators, and the like. Therefore, the clock correction unit 112 corrects the clock frequency to be lower in a case where the frequency of operation clock is higher in the reception apparatus 100 than in the transmission apparatus 200. Also, the clock correction unit 112 corrects the clock frequency to be higher in a case where the frequency of operation clock is lower in the reception apparatus 100 than in the transmission apparatus 200.

Figure 3A:
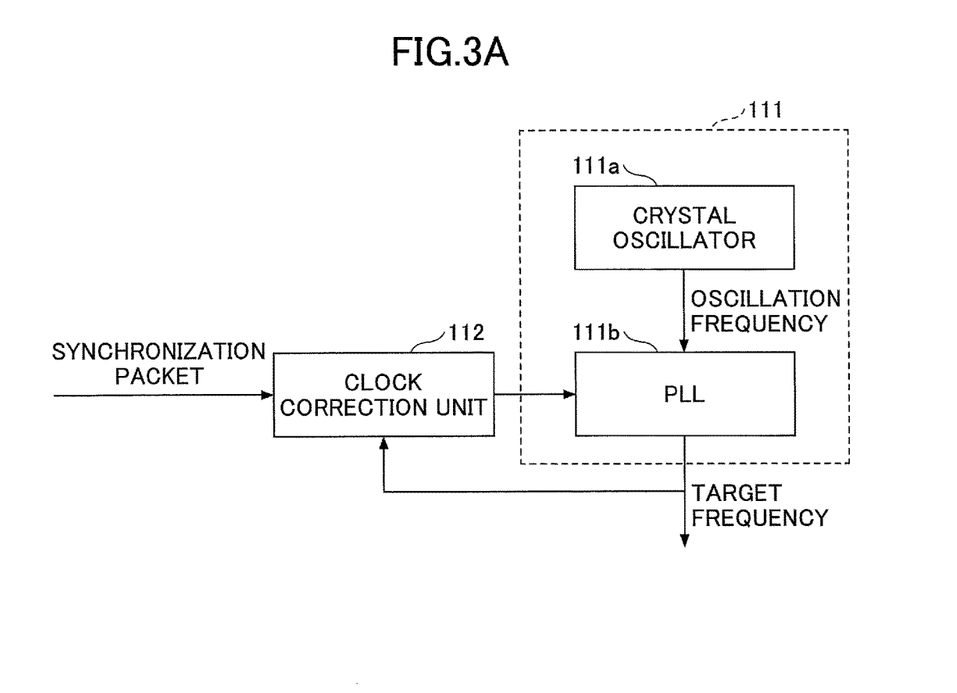
FIG. 3A is a diagram illustrating a first example configuration of a clock generation unit.

FIG. 3A is a diagram illustrating a first example configuration of the clock generation unit 111. The clock generation unit 111 includes a crystal oscillator 111a and a PLL (Phase Locked Loop) 111b. The crystal oscillator 111a generates an oscillation at a fixed frequency to output a clock at the frequency of the oscillation to the PLL 111b. The clock correction unit 112 corrects the clock output to the PLL 111b so as to generate a clock at a target frequency that is the frequency of the operation clock of the transmission apparatus 200. The PLL 111b outputs the clock at the target frequency to the data output unit 114.

Figure 3B:
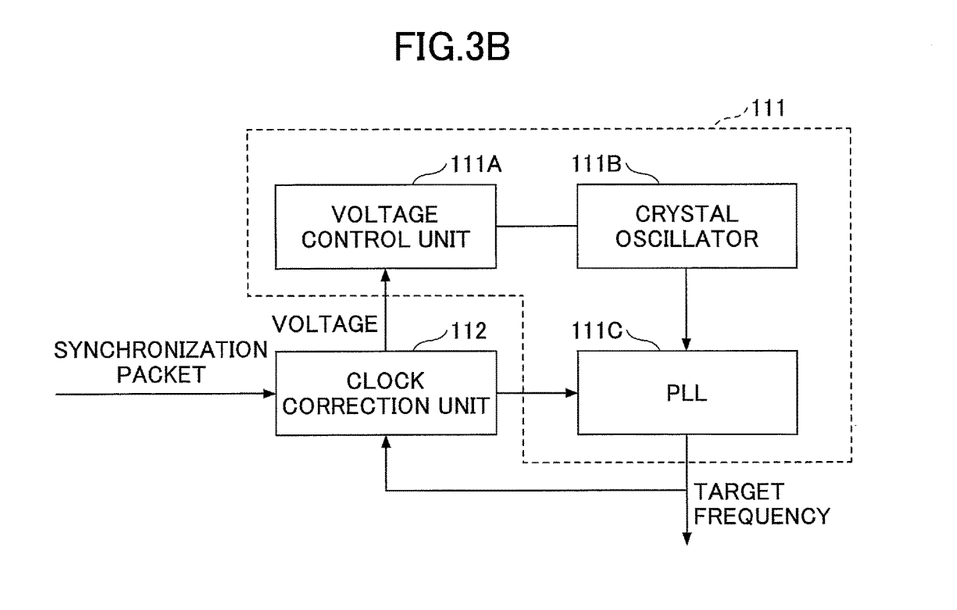
FIG. 3B is a diagram illustrating a second example configuration of the clock generation unit.

FIG. 3B is a diagram illustrating a second example configuration of the clock generation unit 111. The clock generation unit 111 includes a voltage control unit 111A, a crystal oscillator 111B, a PLL 111C. The clock correction unit 112 outputs a value of voltage according to the target frequency to the voltage control unit 111A. The voltage control unit 111A outputs a voltage according to the output value to the crystal oscillator 111B. The PLL 111C generates a clock at the target frequency through frequency dividing operation, and outputs the clock at the target frequency to the data output unit 114.

Figure 4:
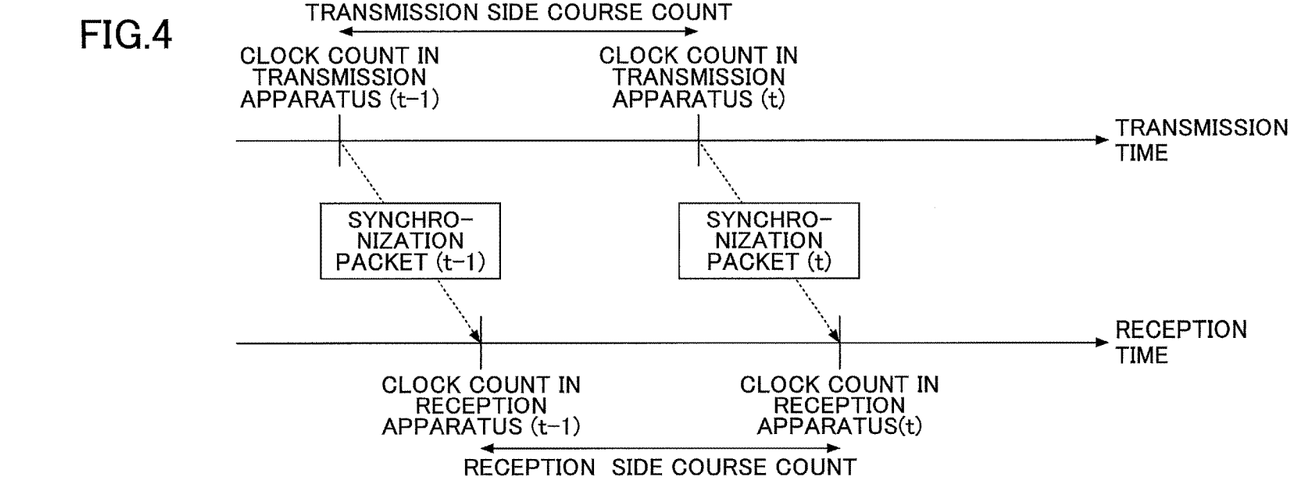
FIG. 4 is a diagram illustrating a clock frequency correction method.

FIG. 4 is a diagram illustrating a clock frequency correction method. An upper side in FIG. 4 illustrates the clock count in the transmission apparatus 200. A number of clocks (transmission side course count) counted by the transmission apparatus 200 is inserted in the synchronization packet (t), where the number of clocks are counted during a period from timing at which the (t−1)th synchronization packet is transmitted to timing at which the (t)th synchronization packet is transmitted. The reception apparatus 100 acquires the transmission side course count from the synchronization packet (t) received from the transmission apparatus 200.

Additionally, in the synchronization packet (t−1), a number of clocks counted by the transmission apparatus 200 is inserted, where the number of clocks are counted during a period from timing at which the (t−2)th synchronization packet is transmitted to timing at which the (t−1)th synchronization packet is transmitted.

Meanwhile, a lower side of FIG. 4 illustrates the clock count of the reception apparatus 100. The reception apparatus 100 acquires a number of clocks counted during a period from timing at which the synchronization packet (t−1) is received to timing at which the synchronization packet (t) is received, where the counted number of clocks is acquired as a reception side course count.

The clock correction unit 112 sets the target frequency by comparing the transmission side course count with the reception side course count. For example, in a case where the clock frequency is 27 MHz, the transmission side course count is "475136", and the reception side course count is "475134", the deviation is 0.074 μsec. In this case, the clock correction unit 112 corrects the clock frequency to be slightly higher since the clock frequency of the reception apparatus 100 is slightly lower than that of transmission apparatus 200.

Additionally, in descriptions given above, the clock count is inserted in the synchronization packet. However, this is not a limiting example. For example, a time stamp value of standard time, etc., may be inserted in the synchronization packet.

Figure 5:
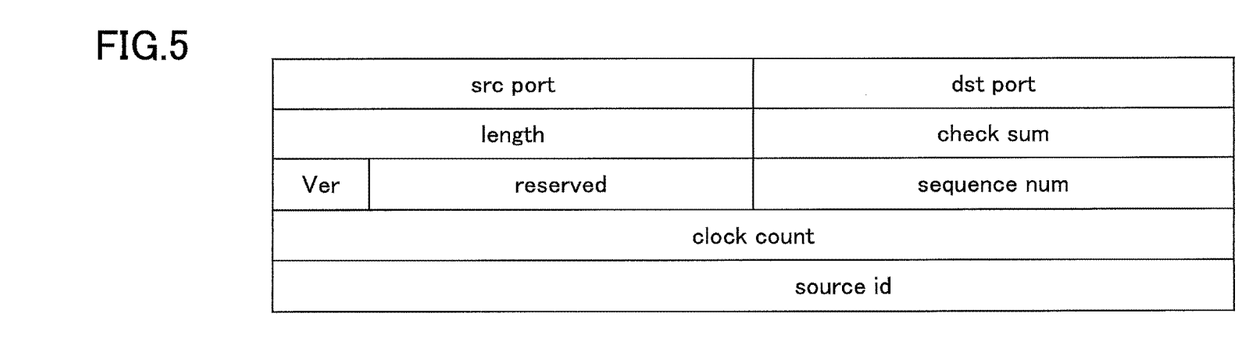
FIG. 5 is a diagram illustrating an example format of synchronization packet.

FIG. 5 is a diagram illustrating an example format of synchronization packet. In FIG. 5, a bit string of 32 bits is included in one row.

"src port" indicates a port number of the transmission apparatus 200 that is the transmission source of a packet. "dst port" indicates a port number of the reception apparatus 100 that is the destination of the transmitted packet. "length" indicates a packet length. "check sum" is a bit string provided for determining a reliability of received data. "Ver" indicates a version of the video image distribution system 1. "reserved" is used in a case where one or more items among items included in the packet is set to be disregarded, and the like.

For example, when a value is set in "reserved", an item A included in the packet is disregarded in a case where the version of the video image distribution system 1 is "1.1", while the item A is used in a case where the version of the video image distribution system 1 is "1.2".

"sequence num" indicates a sequence number for identifying a packet. For example, in a case where the reception apparatus 100 receives a packet of sequence number "3" just after receiving a packet of sequence number "1", the reception apparatus 100 can detect that a packet of sequence number "2" is lost.

"clock count" indicates the transmission side course count. "source id" indicates a number for identifying the transmission apparatus 200 that has transmitted the packet.

Referring back to FIG. 2, the video image data received by the data reception unit 110 is sequentially stored in the data buffer 120, whereas the stored video image data is retrieved in chronological order (in the order from older one). That is, the data buffer 120 is a storage area having a function of FIFO (First In First Out). Additionally, the video image data encoded in compliance with H.264, JPEG, etc., may be stored in the data buffer 120.

The delay control unit 113 controls the correction amount of clock by the clock correction unit 112 so that the data buffer 120 is neither filled with the video image data nor empty. In this way, the delay control unit 113 controls a storage amount of video image data in the data buffer 120.

Figure 6:
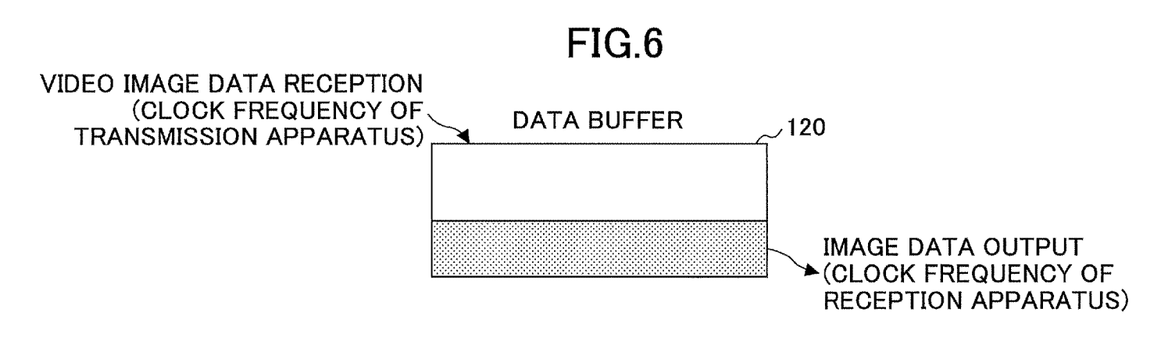
FIG. 6 is a diagram illustrating a data storage amount of a data buffer.

FIG. 6 is a diagram illustrating a data storage amount of the data buffer 120. The data reception unit 110 stores the received video image data in the data buffer 120. The data output unit 114 retrieves the video image data stored in the data buffer 120 in a sequence where the oldest one is retrieved first, and thereby outputs the retrieved video image data to the video image display apparatus 130.

For example, in a case where the clock frequency in the transmission apparatus 200 temporarily becomes higher than the clock frequency in the reception apparatus 100, the clock correction unit 112 corrects the clock frequency to be lower, thereby causing the storage amount of the video image data in the data buffer 120 to be greater, and causing a delay amount to be greater. In this case, the delay control unit 113 controls the clock correction unit 112 so as to have the clock frequency be higher, thereby reducing the storage amount of the video image data in the data buffer 120, and preventing overflow.

On the other hand, in a case where the clock frequency in the transmission apparatus 200 temporarily becomes lower than the clock frequency in the reception apparatus 100, the clock correction unit 112 corrects the clock frequency to be higher, thereby causing the storage amount of the video image data in the data buffer 120 to be smaller, and causing a delay amount to be smaller. In this case, the delay control unit 113 controls the clock correction unit 112 so as to have the clock frequency be lower, thereby increasing the storage amount of the video image data in the data buffer 120, and preventing underflow.

In the following, a storage amount of video image data constantly stored in the data buffer 120 will be described. A storage amount L (number of pixels) constantly stored in the data buffer 120 can be calculated by L=N×M, wherein "N" indicates a pixel clock frequency, and M indicates a maximum clock deviation. Additionally, the maximum deviation of clock means a longest time among times corresponding to difference between a number of operation clocks per second in the reception apparatus 100 and a number of operation clocks per second in the transmission apparatus 200.

For example, in a case where the clock frequency is 27 MHz, a resolution of the video image data is horizontally 1600 pixels and vertically 1200 pixels, and a frames per second value is 60, the pixel clock frequency N is "130.25" MHz. Also, in a case where the maximum deviation M of clock is 1 μsec, the storage amount L is 130.25 (=130.25× 1,000,000×0.000001). Therefore, the delay control unit 113 performs a control so as to store the data corresponding to 131 pixels in the data buffer 120.

Also, a storage capacity of the data buffer 120 may be twice or more of the amount of the video image data to be stored. For example, in a case where the video image data corresponding to 131 pixels are stored in the data buffer 120, the storage capacity of the data buffer 120 may correspond to 262 pixels or more of the video image data.

Thus, the delay control unit 113 has an amount greater than or equal to a predetermined value of the video image data be stored in the data buffer 120, and thereby preventing the overflow. Also, the delay control unit 113 performs the control so as to save an available capacity of the data buffer 120 enough to prevent the underflow.

In the following, a calculation method of the maximum deviation of clock will be described. The maximum deviation of clock becomes greater as an interval between transmissions of synchronization packets becomes longer. The maximum deviation M can be calculated by M=P×Q, wherein "P" indicates a clock synchronous precision, Q indicates the interval (μsec) between transmissions of synchronization packets. The clock synchronous precision means a shift amount of clock in a predetermined period. For example, the shift amount of clock in one second is expressed by a unit of "μsec/sec".

Figure 7:
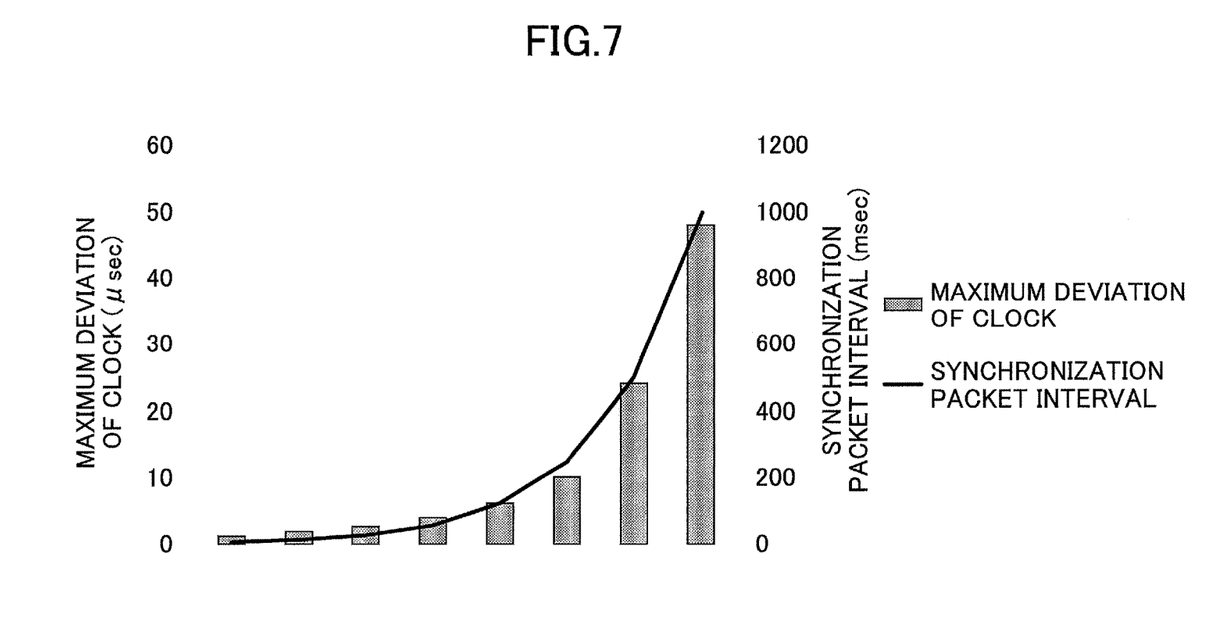
FIG. 7 is a graph illustrating a relationship between a maximum deviation of clock and the interval between synchronization packets.

FIG. 7 is a graph illustrating a relationship between the maximum deviation of clock and the interval between the synchronization packets. A synchronization packet interval that indicates the interval (msec) between transmissions of synchronization packets (synchronization packet interval) is depicted by a line plot. Also, the maximum deviation (μsec) of clock is depicted by bar chart. As illustrated in FIG. 7, the synchronization packet interval is proportional to the maximum deviation of clock. Additionally, in FIG. 7, bar charts of the maximum deviation of clock are arranged in ascending order of the synchronization packet interval where one having shortest synchronization packet interval is positioned at leftmost.

For example, the maximum deviation of clock can be calculated based on a clock synchronous precision of CPU and the synchronization packet interval. The storage capacity of the data buffer 120 and the amount of the video image data to be stored in the data buffer 120 are set based on the calculated maximum deviation of clock. A value of clock synchronous precision regulated for the CPU may be used as the clock synchronous precision.

Also, before transmission/reception of the video image data between the transmission apparatus 200 and the reception apparatus 100 is started, only synchronization packets may be transmitted between the transmission apparatus 200 and the reception apparatus 100 in order to measure the clock deviations, where the largest one among the measured clock deviations is chosen as the maximum deviation of clock. Thus, the amount of video image data to be stored in the data buffer 120 can be found even if the clock synchronous precision of CPU, the synchronization packet interval, etc., of the reception apparatus 100 are unknown.

Second Embodiment

Figure 8:
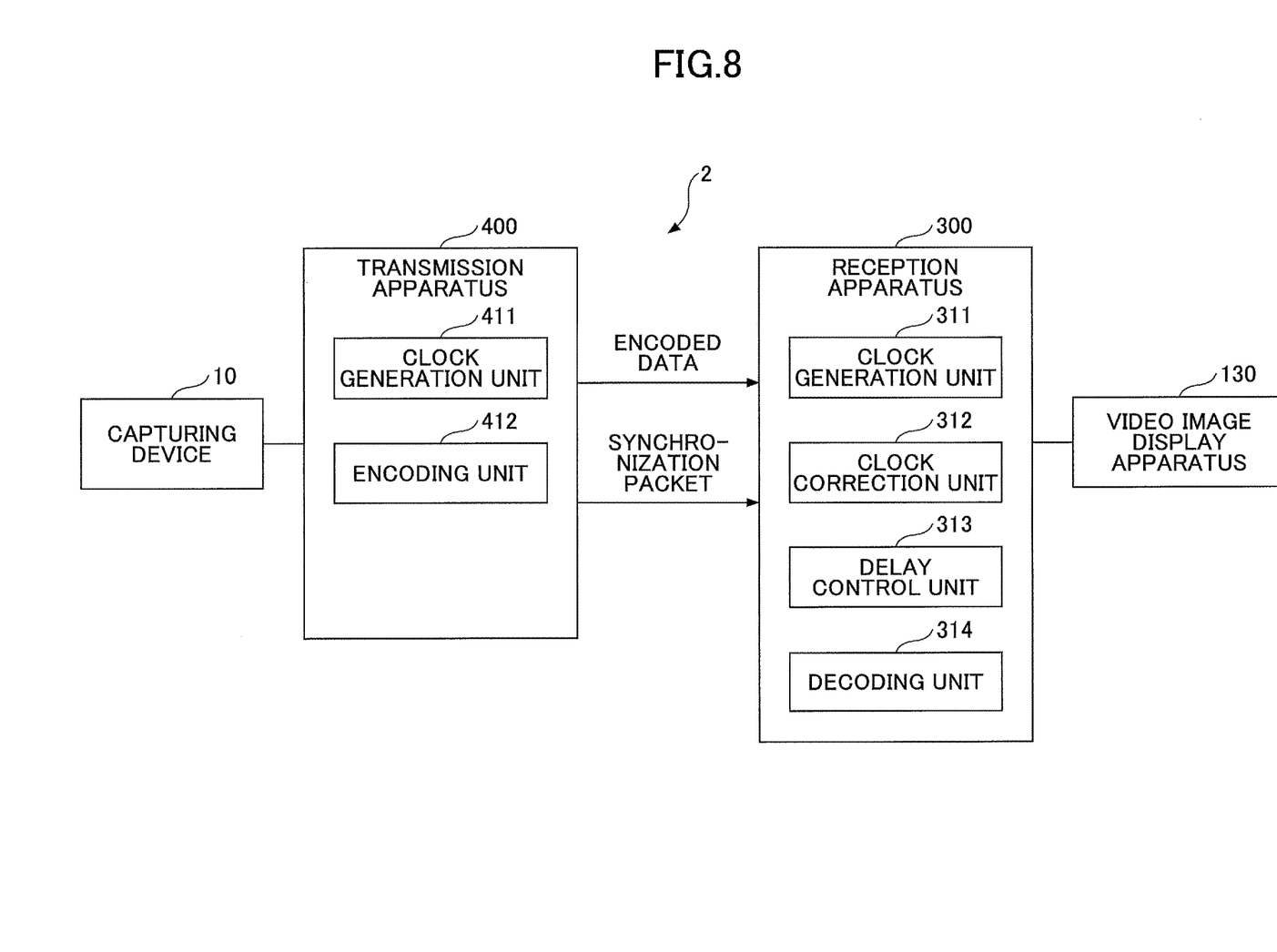
FIG. 8 is a diagram illustrating a second example of video image distribution system.

FIG. 8 is a diagram illustrating a second example of video image distribution system. The video image distribution system 2 includes the capturing device 10, the video image display apparatus 130, a reception apparatus 300, and a transmission apparatus 400. The reception apparatus 300 includes a clock generation unit 311, a clock correction unit 312, a delay control unit 313, and a decoding unit 314. Also, the transmission apparatus 400 includes a clock generation unit 411 and an encoding unit 412.

The transmission apparatus 400 receives the video image data captured by the capturing device 10. The clock generation unit 411 generates an oscillation at a predetermined frequency to generate the operation clock. The encoding unit 412 encodes the video image data by using the operation clock generated by the clock generation unit 411. In the following, the encoded video image data is referred to as encoded data. The transmission apparatus 400 transmits the encoded data to the reception apparatus 300 at the operation clock generated by the clock generation unit 411.

Also, the transmission apparatus 400 generates a synchronization packet at intervals of predetermined clocks. The transmission apparatus 400 counts the clock up to a predetermined number (transmission side course count) to include the counted number of clocks in the synchronization packet, and transmits the synchronization packet to the reception apparatus 300. After the synchronization packet is transmitted, the transmission apparatus 400 resets the counted number, and starts counting the clock again.

The reception apparatus 300 receives the encoded data from the transmission apparatus 400. The clock generation unit 311 generates an oscillation at the same frequency as that of the transmission apparatus 400, thereby generating the operation clock. The clock correction unit 312 corrects a frequency of the operation clock generated by the clock generation unit 311.

A decoding unit 314 decodes the received encoded data at the operation clock corrected by the clock correction unit 312, and sequentially stores the decoded video image data in a buffer. The reception apparatus 300 retrieves the video image data from the buffer at the operation clock corrected by the clock correction unit 312, and transmits the retrieved video image data to the video image display apparatus 130.

The delay control unit 313 controls a correction amount of operation clock by the clock correction unit 312 so that a minimum unit of encoded data required for performing decode operation is constantly stored in the buffer.

Figure 9:
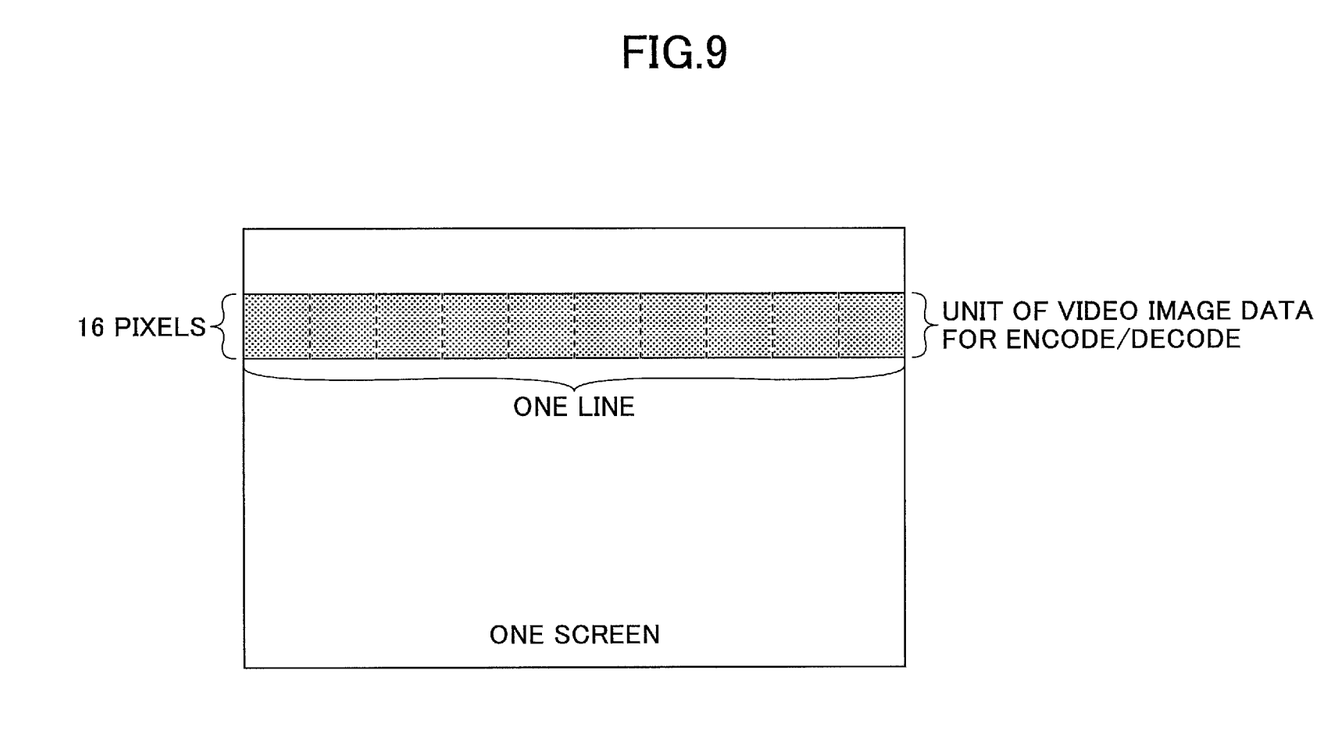
FIG. 9 is a diagram illustrating a unit of data in buffering operation.

FIG. 9 is a diagram illustrating a unit of data in buffering operation. In a case where a unit, which is referred to as a macro block in H.264 encoding system, is 16×16 (pixels), 16 pixels in a vertical direction and pixels corresponding to one line of a screen in a horizontal direction are required in order to output the video image in a raster sequence at a later stage. Therefore, the delay control unit 313 controls an correction amount of the operation clock of the clock correction unit 112 so as to store an amount of the video image data in the buffer, where the amount of the video image data corresponds to encoded data of 16 pixels in a vertical direction and pixels corresponding to one line of a screen in a horizontal direction.

Additionally, although the amount of video image data may vary according to contents of the video image, the variance of the amount of video image can be reduced when a function for controlling the amount of encoded data, which is referred to as rate control, is used. Hence, a capacity of the buffer can be set by using the rate control.

Third Embodiment

Figure 10:
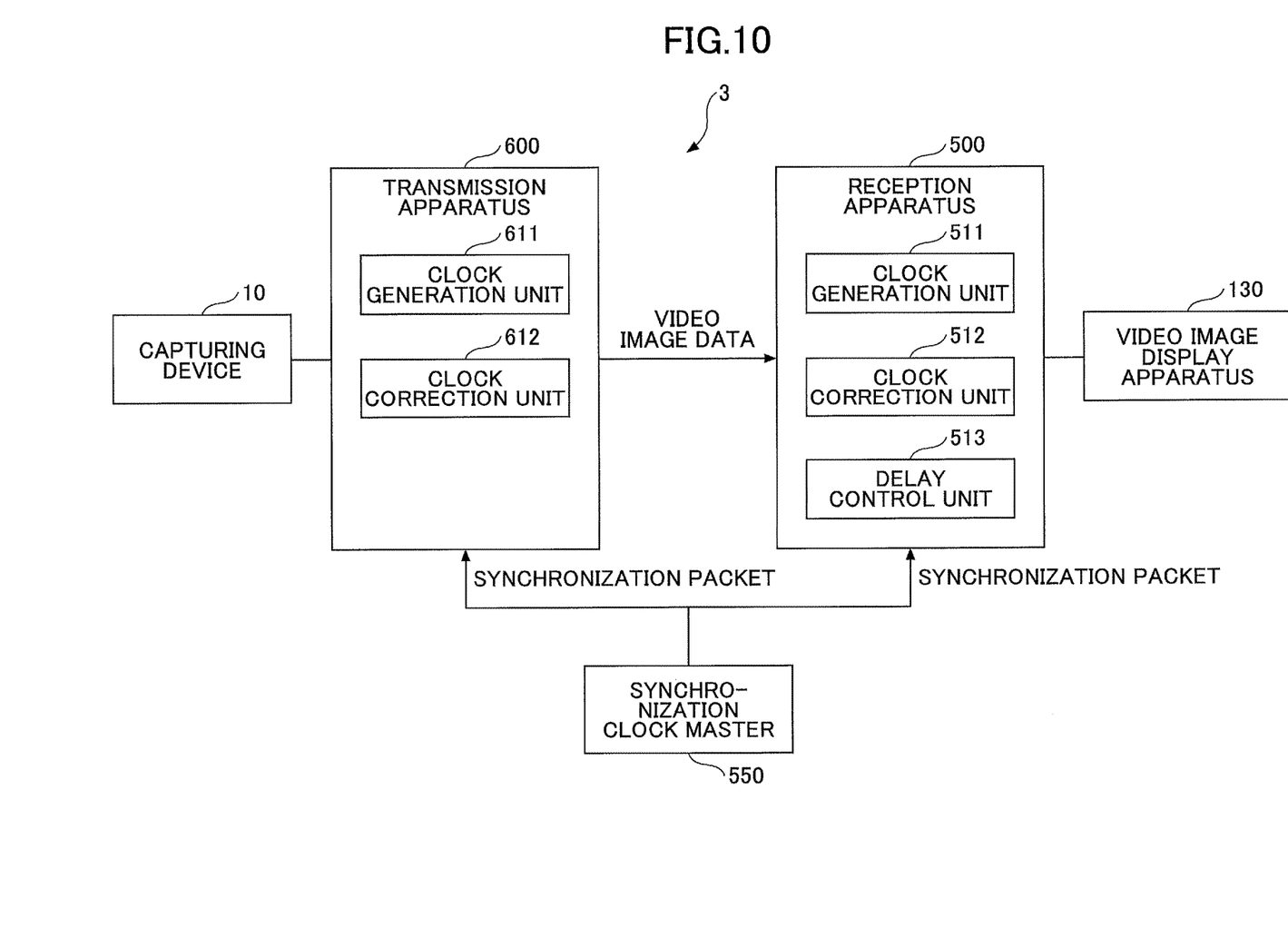
FIG. 10 is a diagram illustrating a third example video image distribution system.

FIG. 10 is a diagram illustrating a third example video image distribution system. The video image distribution system 3 includes the capturing device 10, the video image display apparatus 130, a reception apparatus 500, a synchronization clock master 550, and a transmission apparatus 600. The reception apparatus 500 includes a clock generation unit 511, a clock correction unit 512, and a delay control unit 513. Also, the transmission apparatus 600 includes a clock generation unit 611 and a clock correction unit 612.

The transmission apparatus 600 receives the video image data captured by the capturing device 10.

The clock generation unit 611 generates an oscillation at a predetermined frequency to generate the operation clock. The clock correction unit 612 corrects a frequency of the operation clock generated by the clock generation unit 611. The transmission apparatus 600 transmits the video image data at the operation clock corrected by the clock correction unit 612 to the reception apparatus 500.

Also, the synchronization clock master 550 generates the synchronization packet at intervals of a predetermined number of clocks. The synchronization clock master 550 counts the clock up to a predetermined number to include the counted number of clocks in the synchronization packet, and transmits the synchronization packet to the reception apparatus 500 and the transmission apparatus 600. After the synchronization packet is transmitted, the synchronization clock master 550 resets the counted number to be "0", and starts counting the clocks again.

The clock generation unit 611 generates an oscillation at the same frequency as that of the synchronization clock master 550. The clock correction unit 612 corrects the operation clock generated by the clock generation unit 611. The transmission apparatus 600 transmits the video image data to the reception apparatus 500 at the operation clock corrected by the clock correction unit 612.

The clock generation unit 511 generates an oscillation at the same frequency as that of the synchronization clock master 550. The clock correction unit 512 corrects the operation clock generated by the clock generation unit 511. The reception apparatus 500 retrieves the video image data from the buffer at the operation clock corrected by the clock correction unit 512, and outputs the video image data to the video image display apparatus 130.

For example, the delay control unit 513 controls a correction amount of operation clock by the clock correction unit 512 so that an amount of video image data is constantly stored in the buffer, where the amount corresponds to twice of the deviation between the operation clocks of the reception apparatus 500 and the synchronization clock master 550. That is, the delay control unit 513 controls the amount of video image data stored in the buffer based on an assumption that the deviation between respective operation clocks of the reception apparatus 500 and the synchronization clock master 550 is equal to the deviation between the respective operation clocks of the transmission apparatus 600 and the synchronization clock master 550.

Herein above, although the present disclosure has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

Additionally, in the embodiments of the present disclosure, data reception unit 110 is an example of reception unit. The data buffer 120 is an example of storage area. The clock correction unit 112 is an example of correction unit. The delay control unit 113 is an example of control unit. The data output unit 114 is an example of output unit. The deviation of operation clock is an example of cock information. The synchronization packet is an example of synchronization information. The synchronization clock master 550 is an example of synchronization apparatus. The present application claims priority under 35 U.S.C. §119 to Japanese Patent Application No. 2015-142707 filed on Jul. 17, 2015. The contents of which are incorporated herein by reference in their entirety.

What is claimed is:

1. A reception apparatus for receiving data from a transmission apparatus, comprising:
   a data receiver configured to receive a synchronization packet including clock information generated by the transmission apparatus and data from the transmission apparatus;
   a storage memory, storing the received data;
   a clock adjuster configured to correct a clock of the reception apparatus based on a deviation between a clock of the transmission apparatus and the clock of the reception apparatus by using the clock information generated by the transmission apparatus;
   a controller configured to control a clock correction amount of the clock adjuster based on a storage amount of data in the storage memory; and
   a data output circuit configured to retrieve the data from the storage memory to output the retrieved data in synchronization with the corrected clock,
      wherein the controller controls the clock correction amount of the clock adjuster so that at least an amount of data is stored in the storage memory, the amount corresponding to a maximum value of the deviation,
      wherein the amount is defined as N×M wherein N indicates a pixel clock frequency and M indicates the maximum value of the deviation, and
      wherein the maximum value of the deviation is defined as P×Q, wherein P indicates a clock synchronous precision and Q indicates an interval between transmissions of the synchronization packets.

2. The reception apparatus according to claim 1, wherein a storage capacity of the storage memory is twice or more of the amount corresponding to the maximum value of the deviation.

3. The reception apparatus according to claim 1, wherein the deviation is calculated by the clock adjuster based on a counted number of clocks in the transmission apparatus during a transmission interval of the synchronization packet and a counted number of clocks in the reception apparatus during a reception interval of the synchronization packet.

4. The reception apparatus according to claim 1, wherein the controller controls the clock correction amount of clock adjuster so that an amount of data is stored in the storage memory, the amount corresponding to a minimum unit of encoded data required for decoding the encoded data.

5. A system including a transmission apparatus, a reception apparatus for receiving data from the transmission apparatus, and a synchronization apparatus for transmitting synchronization packets to the transmission apparatus and the reception apparatus, wherein respective synchronization packets transmitted from the synchronization apparatus to the transmission apparatus and to the reception apparatus include the same clock information, the transmission apparatus comprising:
a first clock adjuster configured to correct a clock of the transmission apparatus based on a deviation between a clock of the synchronization apparatus and a clock of the transmission apparatus by using the clock information included in the received synchronization packet;
the reception apparatus comprising:
a data receiver configured to receive the synchronization packet transmitted from the synchronization apparatus and data transmitted from the transmission apparatus;
a storage memory, storing the received data in a storage memory;
a second clock adjuster configured to correct a clock of the reception apparatus based on a deviation between a clock of the synchronization apparatus and the clock of the reception apparatus by using the clock information included in the received synchronization packet;
a controller configured to control a clock correction amount of the clock adjuster based on a storage amount of data in the storage memory; and
a data output circuit configured to retrieve the data from the storage memory to output the retrieved data to an external apparatus in synchronization with the corrected clock,
wherein the controller controls the clock correction amount of the clock adjuster so that at least an amount of data is stored in the storage memory, the amount corresponding to a maximum value of the deviation,
wherein the amount is defined as N×M wherein N indicates a pixel clock frequency and M indicates the maximum value of the deviation, and
wherein the maximum value of the deviation is defined as P×Q, wherein P indicates a clock synchronous precision and Q indicates an interval between transmissions of the synchronization packets.

* * * * *